Feb. 17, 1948.   C. W. LOWE   2,436,111
TRIMMING AND GROOVING MACHINE
Filed April 30, 1945   3 Sheets-Sheet 1

Clarence W. Lowe
INVENTOR.

BY

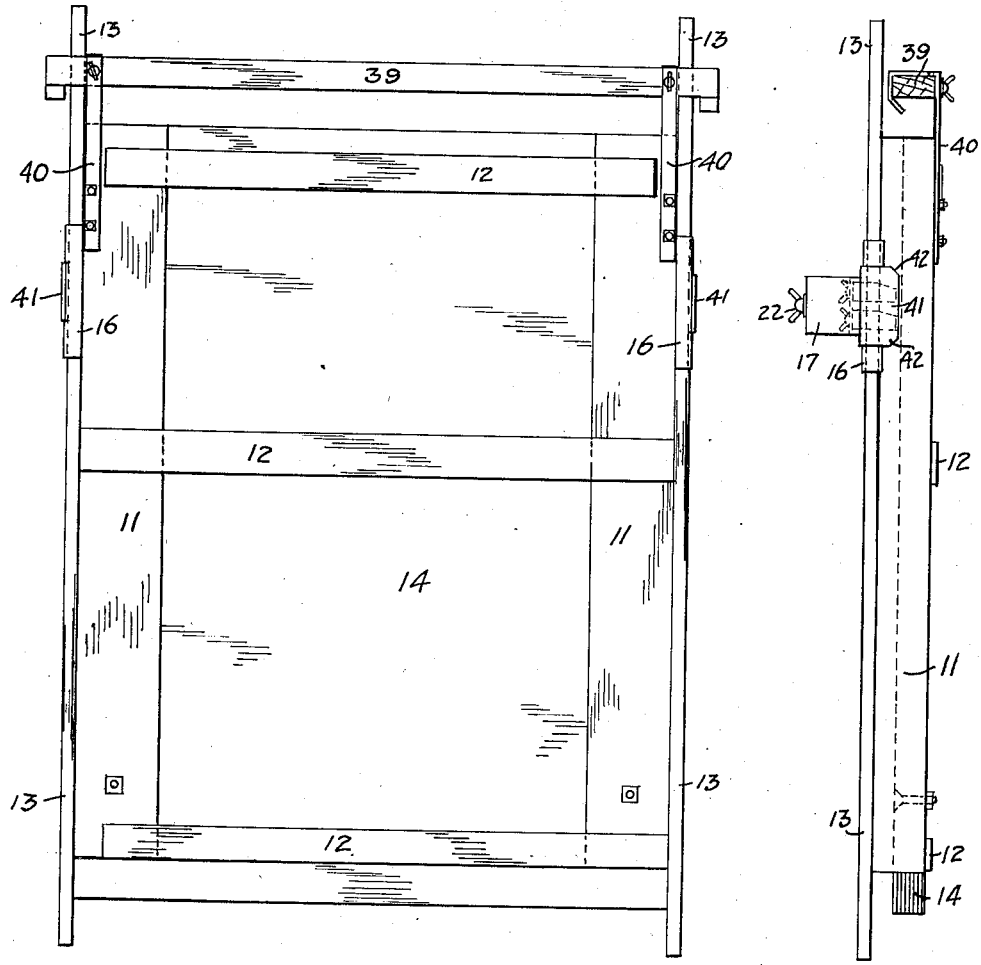

Feb. 17, 1948. C. W. LOWE 2,436,111
TRIMMING AND GROOVING MACHINE
Filed April 30, 1945 3 Sheets-Sheet 3
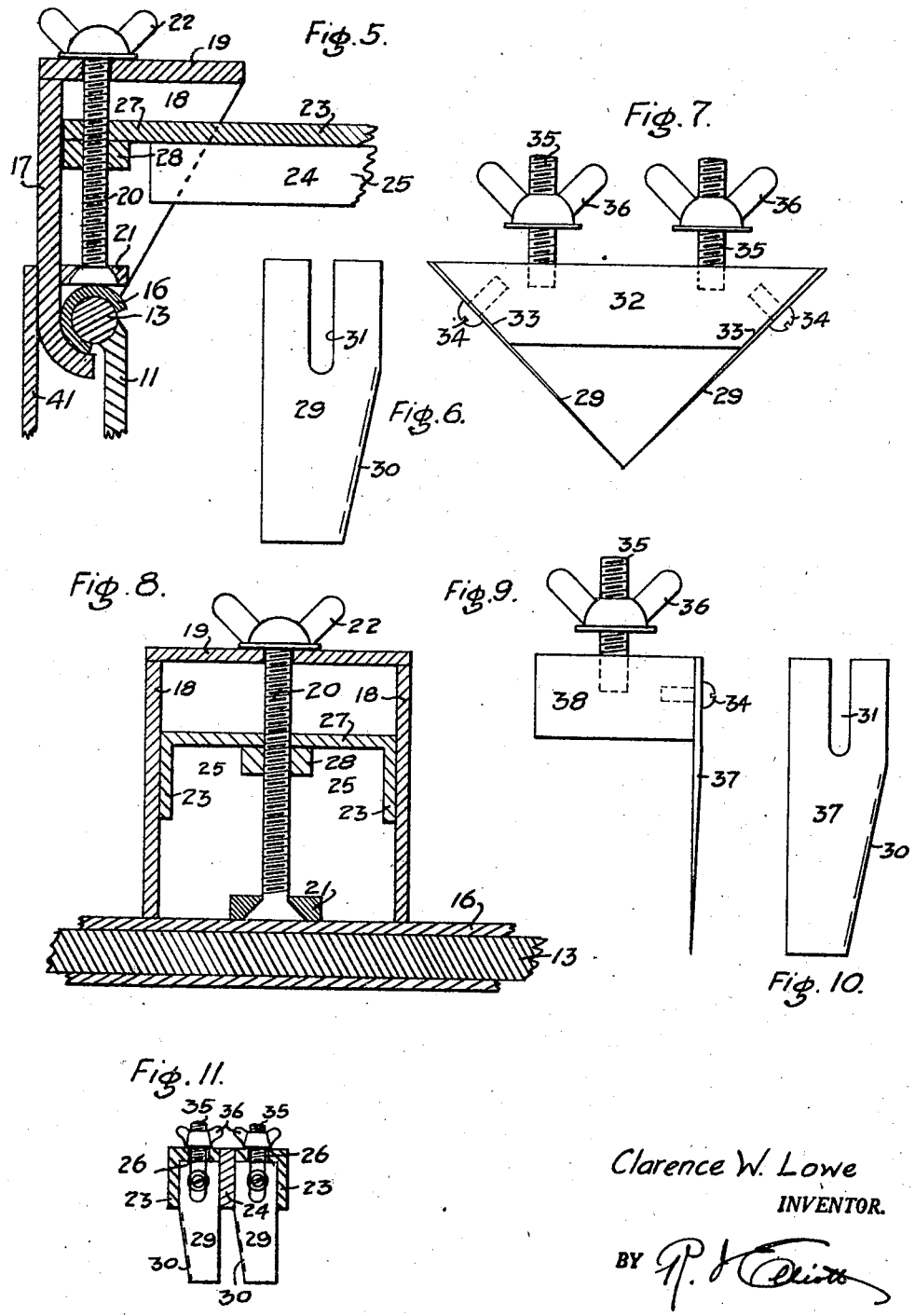
Clarence W. Lowe
INVENTOR.

Patented Feb. 17, 1948

2,436,111

UNITED STATES PATENT OFFICE 2,436,111

TRIMMING AND GROOVING MACHINE

Clarence W. Lowe, Tacoma, Wash.

Application April 30, 1945, Serial No. 591,143

14 Claims. (Cl. 164—73)

This invention relates to machines for trimming and grooving sheet materials, such as "fiberglas" and other similar materials, and has for its objects to provide an apparatus which may be adjusted for any thickness and width of the material and any depth and position of the grooves; which will firmly hold the material while being thus cut and grooved; which is provided with automatic means for removing the stop out of the way of the approaching knives; and which is simple to make and easy and effective to operate.

I attain these and other objects by the devices, mechanisms, and arrangements illustrated in the accompanying drawings, in which—

Figure 1:
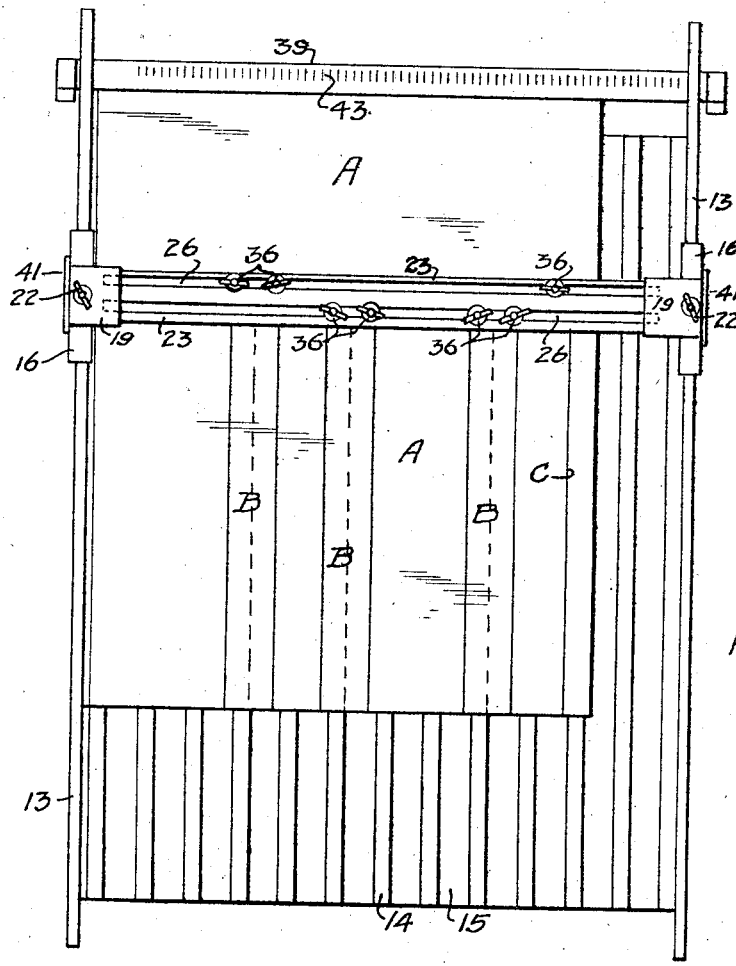
Figure 2:
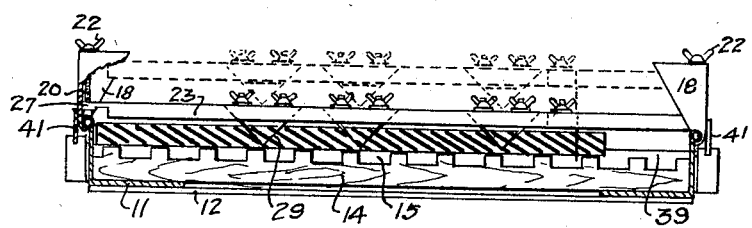

Fig. 1 is a plan view of the machine in operation; Fig. 2 is an end elevation thereof, showing the knife carrier elevated and no material held in the machine; Fig. 3 is a side elevation thereof; Fig. 4 is a bottom plan view taken from below the machine; Fig. 5 is a transverse vertical section of one end of the knife carrier; Fig. 6 is an elevation of one of the grooving knives; Fig. 7 is a rear elevation of the grooving knife assembly; Fig. 8 is a longitudinal vertical section of the end of the knife carrier; Fig. 9 is an elevation of the edge trimming knife assembly; Fig. 10 is a side elevation of the trimming knife; and Fig. 11 is a section, on a reduced scale, of the cross beam of the knife carrier.

Similar numerals of reference refer to similar parts throughout the several views.

In many industries it is necessary to wrap structural parts, such as angle-irons, I-beams, etc., with an insulating material, such as "fiberglas," in order to protect them, and this may most conveniently be accomplished by cutting parallel V-grooves in the sheet of insulation, at proper positions therein, said grooves extending almost completely through the sheet and being positioned to enable the sheet of insulating material to be bent at right-angles at each such groove to fit the piece to be covered by such insulation.

It is therefore necessary that the sheet be trimmed to the correct width and that the grooves be parallel to each other and to the trimmed edge, and that these operations be made simultaneously.

In order to accomplish this I have invented the following described machine. Referring to the drawings, it will be seen that the frame of my machine comprises a pair of parallel angle-irons 11, adapted to be laid on a suitable table (not shown), said angle-irons 11 being connected together by three metal cross-strips 12, welded to their under sides (Figs. 2, 4) to form a rigid frame.

Two circular rods 13 are welded to the upper edges of the angles 11 (Fig. 5) and form the guide tracks for the knife carriage, hereinafter described, which insure that the grooves cut by the machine will be parallel to each other and to the trimmed edge.

A base table 14, composed preferably of heavy plywood, lies on top of the inturned legs of the angles 11. The upper surface of this table 14 is grooved with a series of rectangular grooves 15 extending from end to end of the table and adapted to permit the edge trimming knife to pass entirely through the insulating material being worked on.

The carriage is composed of two semitubular sleeves 16 which are mounted on the said rods 13 and are adapted to slide thereon from end to end, on each of which are mounted vertical carriage frames comprising the end pieces 17 and front and rear inward extending wings 18 and the top plate 19. Each such frame is provided with a rotary supporting and adjusting screw 20 which is based in a lug 21 welded to and extending inward from the said end piece 17, and which passes freely through the said top plate 19. The screw 20 is rotated by a suitable thumb nut 22 welded to its upper end.

The knife carrier cross beam fits between the wings 18 of the two said carriage frames and is vertically movable therein and comprises a structure formed of two angles-irons 23 welded on each side of the upper edge of a separating plate 24 (Fig. 11) to form two downwardly open channels 25. A pair of parallel slots 26 (Fig. 1) extend centrally through the horizontal legs of the angles 23 from end to end. The ends of the vertical legs of the said angles 23 and also the ends of the separating plate 24 are cut shorter than the horizontal legs, thus forming extending lugs 27. Nuts 28 are welded under the lugs 27 and are adapted to operatively engage the threads of the said screws 20 to support the knife carrier beam in vertical adjusted position.

The ends of the said carrier beam fit between the said front and rear wings 18 of the said carriage frames and are guided thereby in their vertical movement caused by the rotation of the adjusting screws 20.

The grooving knives 29 (Fig. 6) are rectangular in form except that their sharpened cutting edges 30 are slightly inclined from the vertical, and each is provided with a slot 31 extending downward from its upper edge.

The knife block 32 fits in either one of the downward facing channels 25 and has its ends 33 cut at 45° converging angles (Fig. 7) and the said knives 29 are secured to the said ends 33 by means of screws 34 passing through said slots 31, said knives being adjusted so that the lower ends of their cutting edges 30 meet. The block 32 is provided with two studs 35 extending from its upper side, which are adapted to pass through one or the other of said slots 26, and with wing nuts 36 by which the blocks 32 are clamped to the beam after having been adjusted along the said slot 26 to bring the knife points to the desired position to cut the V-groove at the desired distance from the edge of the sheet "A" of insulating material. The block 32 and each of the knives 29 fit in the said channel 25, which therefore holds the said knives from twisting on the screws 34.

The trimming knife 37 is similarly mounted on the knife block 38 (Figs. 9, 10) except that it is held in a vertical position instead of being inclined, as above, and it is adjusted to cut entirely through the material "A," thus making the sheet of insulating material the required width. The end of the knife 37, rides in one of the slots or grooves 15 in the table 14.

The sheet "A" or material being cut and grooved is held from sliding on the table 14 under the strain of being cut, by a stop bar 39 which is mounted just beyond the front end of the table 14 in such manner as to engage the forward end of the sheet "A." This stop bar 39 extends across the end of the table and is mounted on springs 40 secured under the front ends of the angle irons 11 and extends upward to be engaged by the sheet "A."

The end pieces 17 of the carriage frames each carry a side plate 41 extending downward therefrom to a point near the lower edge of the angle irons 11, and the front and rear corners of the lower edge of these plates 41 are inclined, as at 42, and are adapted to engage the top of the said stop bar 39 to depress it, against the action of the springs 40, thereby removing it from the path of the knives 32 and 37.

The top surface of this stop bar 39 may be marked with a suitable scale 43 to assist in locating the knife blocks 32 and 38 in their correct positions in the beam channels 25.

It is evident that by the use of two channels 25, I am able to bring the V-grooves quite close together if desired.

Thus it will be seen that, the several knives having been located in their desired positions, and the carriage placed at the rear end of its run on the rods 13, a sheet "A" of the material to be cut and grooved is placed upon the base table 14. Then the screws 20 are turned to bring the cross beam 23 into the proper height to cut the grooves of the desired depth. The carriage is then drawn forward and all the knives cut the grooves "B" in the sheet "A" and trim its edge to the required width, along the line "C" in Fig. 1, and as the carriage reaches its end of travel the stop bar 39 is automatically depressed to permit the said knives to finish the several cuts through the entire length of the sheet "A." It will also be observed that all the grooves "B" and the trimmed edge "C" are parallel throughout the length of the sheet "A."

Having described my invention, what I claim and desire to secure by Letters Patent is:

1. In a grooving machine, the combination with a pair of parallel members forming the sides of the frame of said machine; a table mounted between said sides and adapted to receive the material to be grooved; means for holding the material against motion thereon; guide bars mounted on the upper edges of said members; carriages mounted on said guide bars and slidable thereon; carriage frames on said carriages; a pair of rotatable vertical supporting screws in said carriages; a cross beam supported at each end by said screws, said cross beam having a downwardly open channel on its lower side; knife blocks adjustably supported within said channel, the ends of said blocks being beveled; and two knives secured to the beveled ends of said blocks and adapted to cut grooves in the material on said table.

2. In a grooving and trimming machine, the combination of a frame having parallel sides; guide means on each said sides; a table between said guide means; grooves on said table; carriages mounted on and slidable along said guide means; a crossbeam adjustably mounted on both said carriages; a knife block mounted under said beam and adjustable thereacross; a vertical trimming knife adjustably mounted on said block and adapted to cut through the material on said table and to ride in one of said grooves; a second set of knife blocks mounted under said beam and adjustable thereacross, each said block having beveled ends; and pairs of grooving knives secured to the beveled ends of said blocks and adapted to cut V-grooves in the material on said table, whereby said material is trimmed and grooved in a single operation.

3. In a grooving machine, the combination of a frame having parallel guiding means on its sides; a table between said guiding means and adapted to receive the material to be grooved; carriages mounted on and slidable along said guide means; means supported on said carriages and adapted to cut grooves in the material on said table; a spring-supported stop bar mounted across the end of said table, and adapted to hold the material being grooved from motion on said table; and means on said carriages, adapted to depress said stop bar against the action of said springs to remove said stop bar from the path of said groove-cutting means when said means approaches the end of said material.

4. In a machine as set forth in claim 3, wherein said stop bar extends above the level of the table; and wherein said depressing means comprises plates secured to the outer sides of said carriages, each plate having an inclined lower surface adapted to engage the ends of said stop bar to depress it below the level of said table and out of the way of said groove-cutting means.

5. In a trimming and grooving machine, the combination of a frame; a table adapted to support the material to be trimmed and grooved; means for holding the material from motion on said table; parallel guide means mounted on said frame; carriages mounted on said guide means; a beam supported by said carriages; pairs of grooving knives mounted on said beam and each pair adapted to cut one groove in said material; and a trimming knife adjustably mounted on said beam and adapted to cut through said material to trim its longitudinal edge, said grooving knives and said trimming knife being adapted to simultaneously cooperate to form the finished material.

6. In a grooving machine, the combination with a frame having parallel guide bars on its sides; a table mounted between said guide bars and adapted to receive the material to be grooved; means for holding the material from motion thereon; carriages mounted on said guide bars and slidable thereon; vertical rotatable supporting screws mounted on said carriages; a cross beam supported at each end by said screws and adjustable vertically by manipulation thereof, said cross beam having a downwardly open channel on its lower side; knife blocks supported by said cross beam and fitting in said channel and transversely adjustable therein, the ends of said blocks being beveled; and two knives secured to the beveled ends of each said blocks and adapted to cooperatively cut grooves in the material on said table.

7. In a grooving machine, the combination of a fixed table adapted to support and hold the material to be grooved; parallel guiding means on each side of said table; carriages supported by and sliding on said guiding means; a cross beam supported by and between said carriages; a plurality of downwardly open channels in said cross beam; a plurality of knife blocks fitting in said channels, each independently adjustable therein from end to end of said beam and each having beveled ends; and pairs of knives secured to the beveled ends of said blocks and each fitting across the channel in which its block is secured.

8. A device of the character described comprising a platform, parallel side rails on said platform, a cross-head slidably mounted on the rails, and one or more cutters on the cross-head provided with blades of V-shaped cross-section, extending parallel to the rails.

9. A device of the character described comprising a platform, parallel side rails on said platform, a cross-head slidably mounted on the rails, and one or more cutters on the cross-head provided with blades of V-shaped cross-section, extending parallel to the rails, and means to adjust the cutters lengthwise of the cross-head.

10. A device of the character described comprising a platform, a pair of parallel similar rails attached to the upper face of the platform adjacent the end edges thereof, a cross-head resting on said rails, means on the cross-head to slidably engage said rails, and a pair of cutters on said cross-head adapted to cut grooves in a board placed on the platform and between said rails, each cutter comprising a V-shaped blade extending longitudinally of the rails.

11. A device of the character described comprising a platform, a pair of parallel similar rails attached to the upper face of the platform adjacent the end edges thereof, a cross-head resting on said rails, means on the cross-head to slidably engage the rails, and a pair of cutters on said cross-head adapted to cut grooves in a board placed on the platform and between said rails, each cutter comprising a plate contacting the underside of the cross-head, a blade of V-shaped cross-section extending longitudinally of the rails and fixed to the underside of the plate, and means to attach the plate to the cross-head.

12. A device of the character described comprising a platform, a pair of parallel similar rails attached to the upper face of the platform adjacent the end edges thereof, a cross-head resting on said rails, means on the cross-head to slidably engage the rails, and a pair of cutters on said cross-head adapted to cut grooves in a board placed on the platform and between said rails, each cutter comprising a plate contacting the underside of the cross-head, a blade of V-shaped cross-section extending longitudinally of the rails and fixed to the underside of the plate, and means to attach the plate to the cross-head, said cross-head being formed with a longitudinal slot and said attaching means comprising screws on each of said plates extending through said slot, and nuts on said screws, and a washer on said screws, and interposed between the cross-head and said nuts.

13. A device of the character described comprising a platform, parallel rails on said platform, a cross-head slidably mounted on said rails and spaced above the platform, and one or more cutters of V-shaped cross-section, on said cross-head, and a stop member at one end of said platform.

14. In combination, a platform, side rails fixed to the upper surface of the platform, said rails being parallel to one another, a cross-head slidably mounted on the rails, said cross-head comprising a pair of parallel co-planar slats, guide members fixed to the ends of said slats, and slidably engaging said rails, a slot being formed between said spaced slats, a cutter on said cross-head having a V-shaped blade disposed parallel to said rails, and means extending through said slot to adjustably fix said cutter to said cross-head.

CLARENCE W. LOWE.

REFERENCES CITED

The following references are of record in the file of this patent:

UNITED STATES PATENTS

| Number | Name | Date |
|---|---|---|
| 289,594 | Zieger | Dec. 4, 1883 |
| 1,477,108 | Cobb | Dec. 11, 1923 |
| 179,645 | Cassidy | July 11, 1876 |
| 532,822 | Saltzkorn | Jan. 22, 1895 |
| 1,117,577 | Johnson | Nov. 17, 1914 |
| 2,028,053 | Errig | Jan. 14, 1936 |
| 2,222,256 | Deutscher | Nov. 19, 1940 |
| 1,956,275 | Cook | Apr. 24, 1934 |